J. C. BARKER.
OUTER COVER FOR PNEUMATIC TIRES.
APPLICATION FILED JUNE 28, 1911.

1,021,816.

Patented Apr. 2, 1912.

UNITED STATES PATENT OFFICE.

JOHN CHARLES BARKER, OF LEEDS, ENGLAND.

OUTER COVER FOR PNEUMATIC TIRES.

1,021,816. Specification of Letters Patent. Patented Apr. 2, 1912.

Application filed June 28, 1911. Serial No. 635,704.

*To all whom it may concern:*

Be it known that I, JOHN CHARLES BARKER, a subject of the King of Great Britain and Ireland, residing at Leeds, in the county of York, England, have invented certain new and useful Improvements in the Outer Covers for Pneumatic Tires; and I do hereby declare the following to be a full, clear, and exact description of the invention, such as will enable others skilled in the art to which it appertains to make and use the same.

This invention relates to the outer covers of pneumatic tires, more particularly to such as are used on motor cars; and it has for its object to reduce the wear and tear and the liability to side slipping.

The invention relates to that type of outer cover, which has a series of projections arranged in a staggered or zig-zag manner molded on the tread portion of the covers.

Figure 1:
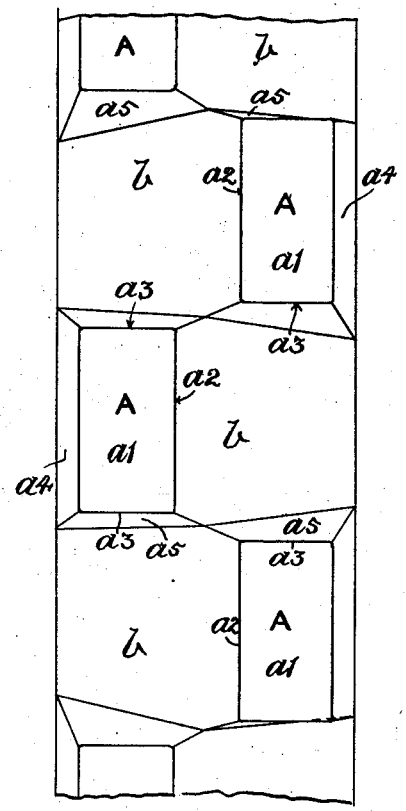
Figure 2:
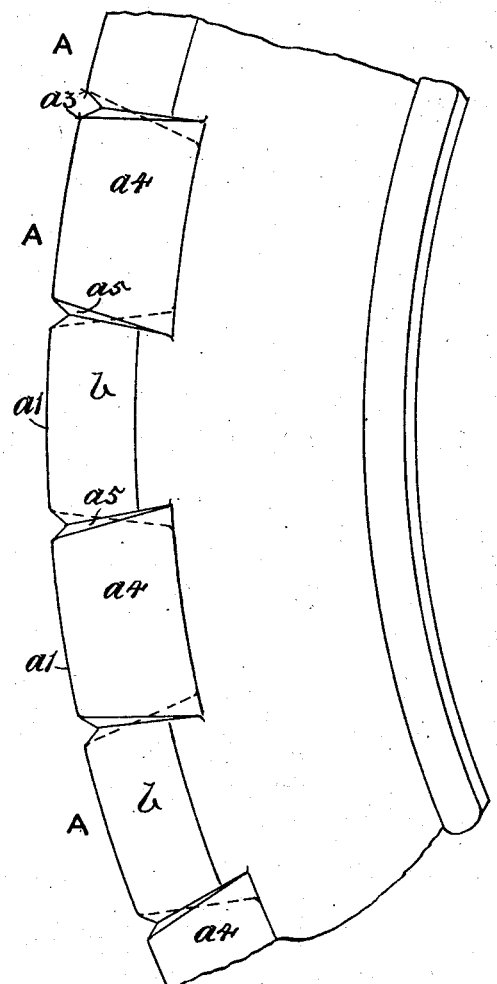
Figure 3:
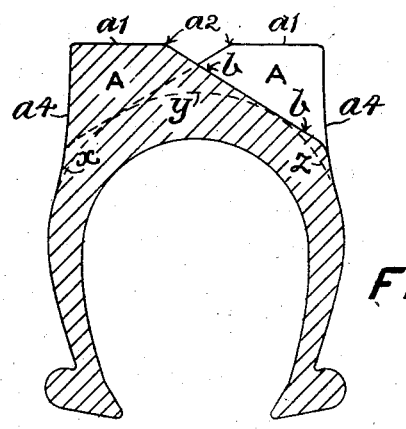

In order that the following description may be more readily and clearly understood, reference is had hereunder to the accompanying drawings: Figure 1 being an edge view, and Fig. 2 a side view of an outer cover constructed in accordance with this invention. Fig. 3 is a cross or radial section of the cover.

A A are the projections above referred to, which are arranged in a staggered or zig-zag manner around the circumference of the cover. According to this invention the tread surface $a^1$ of each projection has a width approximately equal to one third the full or largest width of the tire, the lines $a^2$ of the inner edges of the tread surfaces being one fifth or thereabout of the full width of the tire apart. The adjacent ends $a^3$ of adjoining projections are nearly but not quite in line with one another, as shown. The outer sides $a^4$ of the projections run vertically or approximately vertically downward until they merge in the partly imaginary outer curved surface, (indicated by the dotted line $x\ y\ z$ Fig. 3) of the cover. The inner sides $b$ of the projections A are sloped or beveled toward the opposite side of the tire, so as to be approximately tangential to the curved line $x\ y\ z$ just referred to. These sloping sides thus incline alternately in opposite directions. The end surfaces $a^5$ of the projections run down steeply to the sloping sides $b$. It will be evident that with this construction the tread surfaces $a^1$ stand up beyond the curved outer surface or imaginary curved outer surface of the cover considerably more than is usual with this class of tire cover.

It will be observed that each projection has the form of a four sided truncated flat-topped pyramid, greater in length than in breadth, irregular in form by reason of the greater extent and inclination of its inner side and arranged lengthwise of the line of travel, as to the greater length of the rectangular quadrilateral forming its tread $a^1$. From the straight sides of this quadrilateral the four sides of the projection slope down increasing in width as they descend, except as each long slope $b$ is curtailed at the sides by the more abrupt slopes $a^5$ of the two projections between which it extends.

With a tire cover formed as above described very considerable resistance is offered to side slipping by the vertical outer sides $a^4$ of the projections; while the sloping or beveling of the inner sides $b$ causes the side strains due to such slipping to be more evenly distributed over the full width of the tire, and side yielding of the projection due to the side slipping strain is more effectually resisted. The beveling off of the inner sides $b$ of the projections has the tendency of throwing off to one side any stones or other obstructions caught by such inclined sides, thus reducing the liability to puncture.

Owing to the space left between the two rows of projections, no direct thrust comes on the crown of the arch of, or what would otherwise be the immediate tread portion, of the outer cover; the load or thrust being at any time received by at least three adjoining projections, that is by two in the outer row and one in the inner row, or by two in the inner row and one in the outer row. Further the construction, with a relatively minimum quantity of material in the outer cover, raises the inner surface of the cover from one and a half to twice the usual distance from the ground, thereby greatly lessening the liability to puncture. The surface actually in contact with the ground is lessened and its gripping intensified, while the strain from the surface of any one projection is not so local as usual, as for example where the projections are cylindrical, but owing to the spreading of the base of each projection, is distributed over a larger area and is therefore less severe. The lower portion of the slope *b*, though not strictly forming a side of the projection, is a continuation of such side.

I claim—

1. An outer covering for pneumatic tires provided with integral projections covering the entire tread surface, the said projections being arranged in two rows in staggering manner, each projection being provided with an outer side of slight inclination to the axis of the wheel and an opposite side of considerable inclination extending to the opposite border of the tread between two of the projections of the opposite row.

2. An outer covering for pneumatic tires provided on its tread portion with integral projections arranged in rows, each projection being provided with a flat face inclined with respect to the axis of the wheel extending between two of the projections of an adjoining row and bordering on said projections, said face having a straight upper border in the line of travel of the tire.

3. An outer covering for pneumatic tires provided on its tread portion with integral projections each having a flat top or tread with a straight inner border line and a flat face of considerable inclination to the axis of the wheel extending downward and laterally from said line between two other projections and to the same.

4. An outer covering for pneumatic tires provided with two rows of four-sided frustro-pyramidal integral projections arranged around the tread of the tire in staggering manner and entirely covering said tread, each projection having a flat face inclined at an angle to the axis of the wheel, having its upper edge in a straight line and sloping across the tire to the opposite side thereof between two projections of the other row, and bordering on them.

5. An outer covering for pneumatic tires provided on its tread portion with integral projections arranged in rows in a staggering manner and entirely covering said tread, each of said projections having a flat straight sided top or tread, an approximately vertical flat outer face, a flat inner face, considerably inclined to the axis of the wheel and extending between and bordering on two projections of another row and two additional sides substantially as set forth.

6. An outer covering for pneumatic tires provided with a series of integral projections covering all of its tread surface, each of said projections having a flat tread and four flat sides, one of said sides having a much greater inclination to the axis of the wheel than any of the others and extending laterally between two other projections for the purpose set forth.

7. An outer covering for pneumatic tires provided with rows of lateral projections arranged in staggering manner covering all of its tread surface, each of said projections having a flat rectangular tread and four flat sides, one of said sides having a greater inclination than any of the others and extending laterally between two projections of another row, the neighboring projections of the two rows having the proximate corners of their tread arranged at considerable intervals.

In testimony whereof, I have signed my name to this specification in the presence of two subscribing witnesses.

JOHN CHARLES BARKER.

Witnesses:
J. CLARK JEFFERSON,
FRED WALKER.

---

Copies of this patent may be obtained for five cents each, by addressing the "Commissioner of Patents, Washington, D. C."